US008474567B2

(12) United States Patent
Parigger

(10) Patent No.: US 8,474,567 B2
(45) Date of Patent: Jul. 2, 2013

(54) METHOD FOR CALIBRATING AN ACTUATOR OF AN ALL-WHEEL DRIVE CLUTCH

(75) Inventor: Martin Parigger, Eggersdorf (AT)

(73) Assignee: Magna Powertrain AG & Co. KG, Lannach (AT)

( * ) Notice: Subject to any disclaimer, the term of this patent is extended or adjusted under 35 U.S.C. 154(b) by 971 days.

(21) Appl. No.: 12/228,677

(22) Filed: Aug. 13, 2008

(65) Prior Publication Data

US 2009/0045001 A1 Feb. 19, 2009

(30) Foreign Application Priority Data

Aug. 13, 2007 (DD) .......................... 10 2007 038 151

(51) Int. Cl.
*B60K 17/344* (2006.01)

(52) U.S. Cl.
CPC .................................. *B60K 17/344* (2013.01)
USPC .......................................... 180/248; 180/233

(58) Field of Classification Search
USPC ................................ 180/233, 248; 701/67, 68
See application file for complete search history.

(56) References Cited

U.S. PATENT DOCUMENTS

| | | | | | |
|---|---|---|---|---|---|
| 4,417,641 A | * | 11/1983 | Kageyama | ..................... | 180/247 |
| 4,874,056 A | * | 10/1989 | Naito | ........................... | 180/233 |
| 4,896,738 A | * | 1/1990 | Kodama | ........................ | 180/233 |
| 5,046,383 A | * | 9/1991 | Butts et al. | .................... | 477/120 |
| 5,060,747 A | * | 10/1991 | Eto | ............................... | 180/197 |
| 5,090,510 A | * | 2/1992 | Watanabe et al. | ............ | 180/197 |
| 5,208,755 A | * | 5/1993 | Tezuka | ............................. | 701/88 |
| 5,219,038 A | * | 6/1993 | Hamada et al. | ............... | 180/248 |
| 5,270,930 A | * | 12/1993 | Ito et al. | ............................ | 701/69 |
| 5,492,194 A | * | 2/1996 | McGinn et al. | ............... | 180/233 |
| 6,105,702 A | * | 8/2000 | Showalter | ..................... | 180/247 |
| 6,386,348 B1 | * | 5/2002 | Kunii | ............................... | 192/35 |
| 6,386,351 B1 | * | 5/2002 | Salecker et al. | ............. | 192/54.1 |
| 6,606,549 B1 | * | 8/2003 | Murakami et al. | ............. | 701/89 |
| 6,697,725 B1 | * | 2/2004 | Williams | ......................... | 701/69 |
| 7,032,733 B2 | | 4/2006 | Parigger | | |
| 7,124,850 B2 | * | 10/2006 | Lee et al. | ....................... | 180/248 |
| 7,491,145 B2 | * | 2/2009 | Mizon et al. | ................... | 475/206 |
| 7,497,297 B2 | * | 3/2009 | Watson et al. | ................ | 180/248 |
| 7,613,558 B2 | * | 11/2009 | Yoneda | ............................ | 701/67 |
| 7,873,457 B2 | * | 1/2011 | Christofl et al. | ................ | 701/67 |
| 2002/0002433 A1 | * | 1/2002 | Matsuno | ........................ | 701/67 |
| 2004/0020700 A1 | * | 2/2004 | Watson et al. | ................ | 180/247 |
| 2004/0092363 A1 | * | 5/2004 | Maekawa | ........................ | 477/74 |

(Continued)

FOREIGN PATENT DOCUMENTS

| DE | 103 46 671 A1 | 8/2003 |
|---|---|---|
| DE | 103 46 673 A1 | 8/2003 |
| DE | 2006 029 741 A1 | 6/2006 |

*Primary Examiner* — Paul N Dickson
*Assistant Examiner* — Maurice Williams
(74) *Attorney, Agent, or Firm* — Dickinson Wright PLLC

(57) ABSTRACT

A method for the readjustment of an actuator of an all-wheel drive clutch of a motor vehicle that includes determining a clutch slip value corresponding to a difference between the speed of a primary axle and the speed of a secondary axle; determining a reference secondary axle torque corresponding to the proportion of a driving torque which is transmitted to the secondary axle and for which a clutch slip value of substantially zero is expected; and comparing the clutch slip value with a threshold value and comparing a desired clutch torque with the reference secondary axle torque. A desired clutch torque/control signal relationship for the clutch actuator is changed in dependence on the result of these comparisons.

18 Claims, 4 Drawing Sheets

U.S. PATENT DOCUMENTS

| | | |
|---|---|---|
| 2004/0210374 A1* | 10/2004 | Werner et al. .................. 701/67 |
| 2005/0177295 A1* | 8/2005 | Rodrigues et al. ............. 701/67 |
| 2006/0191729 A1* | 8/2006 | Billig et al. .................. 180/247 |
| 2006/0293145 A1 | 12/2006 | Lanker |
| 2008/0004783 A1* | 1/2008 | Mizon et al. .................... 701/67 |
| 2008/0215220 A1* | 9/2008 | Winkel et al. .................. 701/68 |
| 2010/0161189 A1* | 6/2010 | Le Neindre et al. ............ 701/68 |

\* cited by examiner

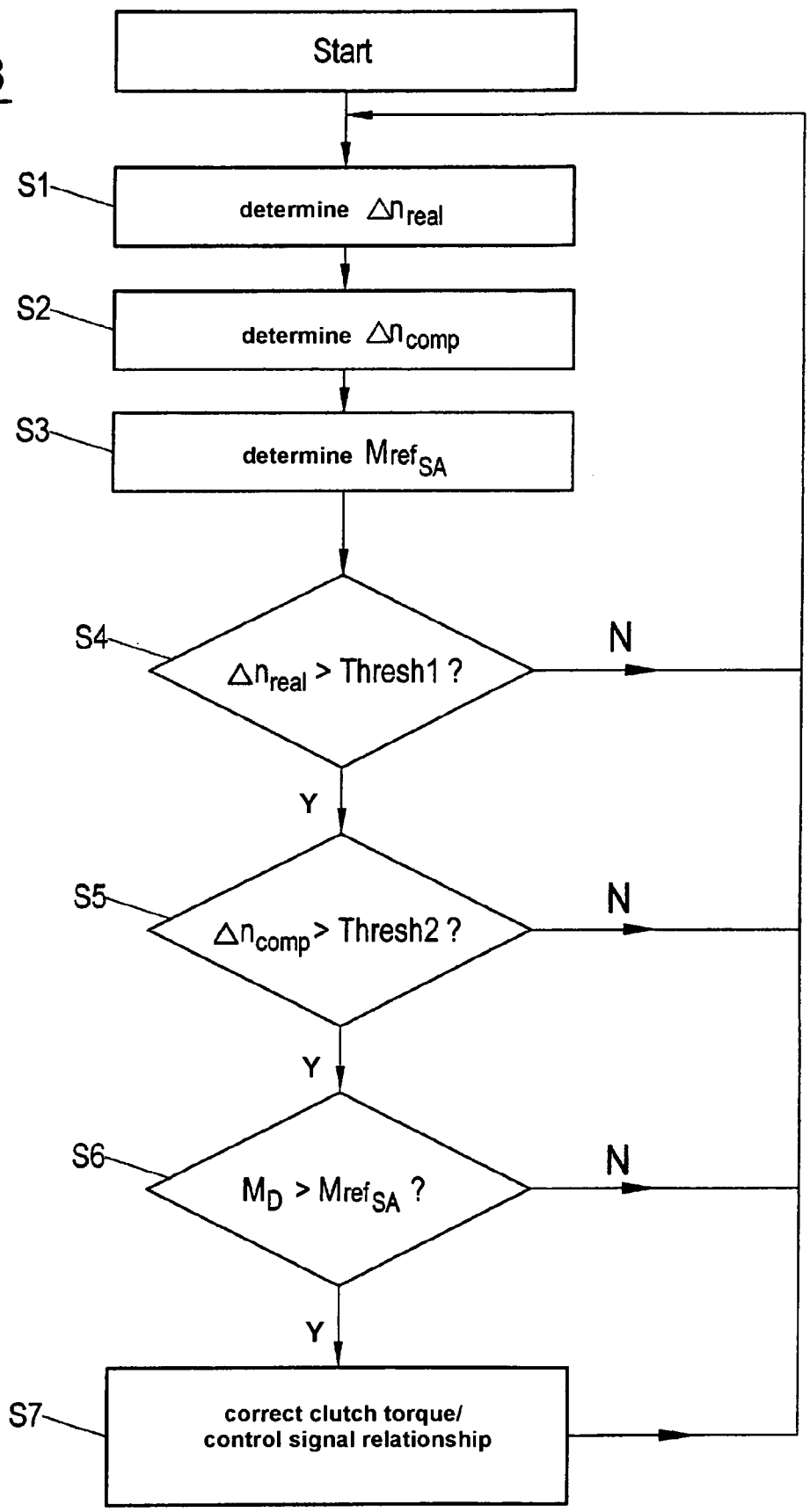

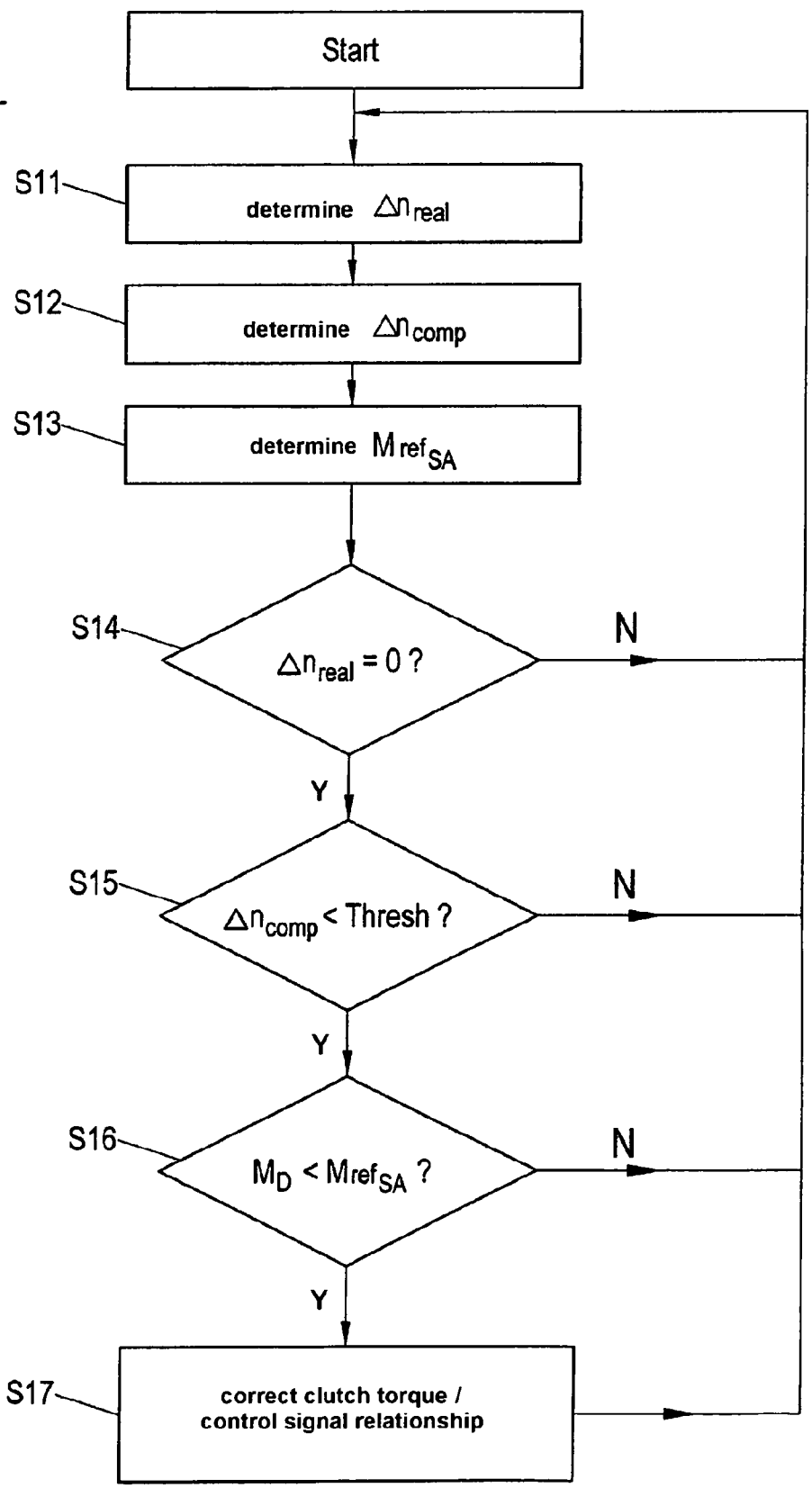

METHOD FOR CALIBRATING AN ACTUATOR OF AN ALL-WHEEL DRIVE CLUTCH

CROSS-REFERENCE TO RELATED APPLICATIONS

This application claims the benefit and priority of German Patent Application No. 10 2007 038 151.6 filed Aug. 13, 2007. The entire disclosure of the above application is incorporated herein by reference.

FIELD

The present disclosure relates to a method for the readjustment of an actuator of an all-wheel drive clutch of a motor vehicle.

BACKGROUND

This section provides background information related to the present disclosure which is not necessarily prior art.

In a motor vehicle having an all-wheel drive that may be switched in, at least a part of a driving torque of a drive unit is permanently transmitted to a primary axle of the motor vehicle. A part of the driving torque may also optionally be transmitted to a secondary axle of the vehicle by means of a friction clutch (e.g., a multi-disk clutch).

A desired clutch torque is calculated for this purpose in an associated control unit on the basis of vehicle state parameters—such as a wheel speed difference between the primary axle and the secondary axle, a steering angle, and a yaw rate of the vehicle. To set this desired clutch torque at the all-wheel drive clutch of the motor vehicle, a control signal is fixed for a clutch actuator in accordance with a predetermined desired clutch torque/control signal relationship, with this control signal corresponding to a specific adjustment path of the actuator and thus of the clutch. The desired clutch torque/control signal relationship may, for example, be stored as a function or as a table. This relationship typically has a substantially linear development in the relevant range so that this relationship may be characterized by an offset value and a gradient. The actuation of the all-wheel drive clutch by means of the associated actuator may take place, for example, electrically, electromechanically, electromagnetically, hydraulically, or magnetorheologically.

The desired clutch torque/control signal relationship for the control of the clutch actuator may be fixed, for example, by an ex works calibration of the clutch. However, this relationship can change over the course of time due to wear phenomena so that the clutch torque set by means of the actuator no longer corresponds to the desired clutch torque value. To avoid this effect, a readjustment of the actuator based on a setting precision observation is required. A direct measurement of the torque transmitted by means of the all-wheel drive clutch is, however, undesirably complex and/or expensive.

It is known from DE 103 46 671 A1 to calculate the actual clutch torque from the drive slip at the front axle, from the drive slip at the rear axle, and from the total driving torque. However, this method requires that the drive slip at the front axle and the drive slip at the rear axle are known as separate values or that the constants for the calculation of the driving torque transmitted at the front axle and at the rear axle may be cut, which does not always correspond to the conditions actually prevailing in practice.

DE 103 46 673 A1 describes a method in which an adjustment path is preset for the clutch actuator and would have to result in a fully blocked state of the clutch in accordance with a characteristic; and a check is made whether a slip occurs for the transmission clutch. For this purpose, the clutch must, however, be brought into the blocked state, which can undesirably influence the handling of the motor vehicle, in particular when this state should be maintained over a longer period to increase the precision of the method by averaging the measured values.

SUMMARY

This section provides a general summary of the disclosure, and is not a comprehensive disclosure of its full scope or all of its features.

The present disclosure provides a simple and robust method for the readjustment or calibration of an actuator of an all-wheel drive clutch of a motor vehicle, which avoids the disadvantages discussed above.

This method includes determining a clutch slip value corresponding to a difference between the speed of the primary axle and the speed of the secondary axle; determining a reference secondary axle torque corresponding to the proportion of the driving torque which is transmitted to the secondary axle and for which a clutch slip value of substantially zero is expected; and comparing the clutch slip value with a threshold value and comparing the desired clutch torque with the reference secondary axle torque, wherein the desired clutch torque/control signal relationship is changed in dependence on the result of the comparisons.

A clutch slip torque is therefore determined in this method, which corresponds to the speed of the primary axle of the motor vehicle less the speed of the secondary axle of the motor vehicle. These speeds may be derived, for example, from the signals of the wheel speed sensors of the motor vehicle, with the signals of the sensors of one axle being averaged.

Furthermore, a so-called reference secondary axle torque may be determined. This corresponds to that proportion of the driving torque that is transmitted to the secondary axle of the motor vehicle and for which a clutch slip value of substantially zero theoretically results when all the wheels of the motor vehicle move with the same friction coefficient (actual or compensated clutch slip value, as explained below) on a subsurface. The reference secondary axle torque thus corresponds to a predetermined distribution of the driving torque to the primary axle and to the secondary axle and thus corresponds to a predetermined reference point on the so-called slip curves of the wheels of the front axle and of the rear axle (slip curve=dependence of the torque transmitted from the wheels of the respective axle on the drive slip).

The named proportion of the driving torque may be determined empirically for a specific vehicle type and may in particular be fixed in accordance with an axle load distribution of the motor vehicle, with this proportion being able to be assumed to be constant in simplified terms. The instantaneous driving torque may, for example, be determined with reference to engine data and to data of a transmission control of the motor vehicle, with the data usually being available via a data bus of the motor vehicle (e.g. a CAN bus).

The clutch slip value determined in this manner may be compared with a predetermined threshold value, with this threshold value amounting to zero or corresponding to a tolerance value of practically zero. If the clutch slip value is larger (or smaller) than the threshold value, a conclusion may be drawn that the speed of the secondary axle is smaller (or larger) than the speed of the primary axle. In addition, the preset desired clutch torque may be compared with the reference secondary axle torque. If the desired clutch torque is smaller (or larger) than the reference secondary axle torque, a conclusion may be drawn that—with respect to the predetermined distribution of the driving torque—a non-balanced distribution of the driving torque is requested by the associated control unit, with a lower speed accordingly having to be present at the secondary axle than at the primary axle (or at least an equally high speed as at the primary axle).

If the results of these two checks do not coincide (e.g., if the speed of the secondary axle is less than the speed of the primary axle and if a higher driving torque should actually be transmitted to the secondary axle than in accordance with the reference secondary axle torque), the desired clutch torque/control signal relationship may be corrected accordingly. An offset value of this relationship may, for example, be changed for this purpose since it has been shown that the explained wear phenomena in an actuator of an all-wheel drive clutch have an effect on the offset value and less on the gradient of the desired clutch torque/control signal relationship. The matching may take place proportionally to the deviation of the clutch slip value from the threshold value and/or proportionally to the deviation of the desired clutch torque from the reference secondary axle torque. Alternatively, the correction of the desired clutch torque/control signal relationship may take place in predetermined fixed values (i.e., in steps of a predetermined magnitude).

The changed desired clutch torque/control signal relationship may be taken into account on subsequent actuations of the clutch until another readjustment is carried out based on the constantly carried out observation of the setting precision.

It should be understood that the explained reference secondary axle torque for which a clutch slip value of substantially zero is expected is used as the reference for the check of the setting precision of the actuator of the all-wheel drive clutch. A single reference point may thus be fixed for the check of the setting precision and may substantially be based on a one-time examination of the respective vehicle type. The explained reference secondary axle torque is particularly well suited as a reference point for later setting precision observations since the setting procedures of the clutch actuator relevant in practice also mainly take place for a range of the desired clutch torque/control signal relationship, which corresponds to an almost balanced distribution of the driving torque over the two vehicle axles.

The method of the disclosure does not require that, on a calculation of the driving torque transmitted at the front axle and of the driving torque transmitted at the rear axle, the respective drive slip be multiplied by a constant that is identical for the front axle and for the rear axle and may thus be cut on a calculation. The method instead takes into account that the slip curve for the wheels of the front axle and the slip curve for the wheels of the rear axle may be different in the linear range. It is thus permitted that, with an equal drive slip at the front axle and at the rear axle, the respective driving torque at the two axles is different at the two axles or that, with an equal distribution of the driving torque to the front axle and to the rear axle, a different drive slip is set. This may be achieved by observation of a single point on the respective slip curve, namely by the explained fixing of a proportion of the driving torque at the secondary axle for which a clutch slip value of substantially zero is expected.

A direct measurement of the driving torque actually transmitted by the clutch is thus not necessary. The all-wheel drive clutch also does not have to be brought into a blocked state or into another check state to be able to analyze the setting precision. The setting precision observation, however, may take place constantly in the ongoing operation of the all-wheel drive clutch.

It should be noted that the explained checks may be carried out with reference to clutch slip values and to values of the reference secondary axle torque that have been determined while driving straight ahead and at a constant driving speed or a constant acceleration of the motor vehicle. It is hereby ensured that the check of the setting precision is not falsified by driving state changes.

Moreover, an averaging of the speed of the primary axle and of the speed of the secondary axle or of the corresponding signals of the wheel speed sensors may take place over a predetermined time period to determine the named clutch slip value therefrom. The same applies accordingly to the driving torque (i.e., the values detected over a predetermined time period are also averaged to determine the reference secondary axle torque). The precision of the check and readjustment of the clutch actuator may be increased by these measures.

In accordance with the method, at least the following conditions are checked, which are called torque increase conditions. A check is made, on the one hand, whether the clutch slip value is larger than a threshold value (e.g., zero or tolerance value of almost zero). A check is therefore hereby made whether the speed of the primary axle is larger than the speed of the secondary axle. A check is made, on the other hand, whether the desired clutch torque is larger than the reference secondary axle torque. A check is therefore hereby made whether an equally high speed is actually expected for the secondary axle based on a preset non-balanced distribution of the driving torque as for the primary axle.

If these two conditions are satisfied, (i.e., if these two checks deliver a positive result), the desired clutch torque/control signal relationship is matched in the sense of an increase of the proportion of the drive torque transmitted to the secondary axle with a given desired clutch torque. Since the clutch slip value is positive and since the clutch is thus in slip, it is assumed that a driving torque is transmitted to the secondary axle, which corresponds to the clutch torque. Since a higher speed is found at the primary axle than at the secondary axle although the desired clutch torque (i.e., the driving torque expected at the secondary axle) is actually larger than the reference secondary axle torque, it is assumed that the actuator controls the clutch to make a small torque transmission.

Where reference was made to a clutch slip value, an actual clutch slip value may be the speed difference between an input element and an output element of the clutch without additional corrections or compensations.

Alternatively, the clutch slip value may, however, be a tire tolerance compensated clutch slip value that corresponds to the actual clutch slip value, with, however, a property difference of the wheels of the primary axle, on the one hand, and of the wheels of the secondary axle, on the other hand, additionally being taken into account. This clutch slip value is thus corrected with respect to a clutch slip that results solely from the wheels of the primary axle and the wheels of the secondary axle being different (e.g., have a slightly different diameter and/or a slightly different tire pressure and/or a tire pressure deviating from the respective desired value, etc.). These property differences or the speed differences resulting therefrom may be determined for a specific vehicle with reference to long-term measurements, such as is known, for example for dynamic driving regulations (e.g. electronic stability program, ESP). A corresponding tire tolerance compensation value is therefore frequently available via the data bus of the vehicle so that an algorithm does not have to be specifically implemented in the control unit of the all-wheel drive clutch for the calculation of such a tire tolerance compensation value. Since the clutch slip resulting solely from the property differences of the wheels is taken out of the determined speeds in the setting precision check, a still higher precision may be achieved for the readjustment of the actuator.

It is advantageous if the clutch slip values are both the actual slip at the all-wheel drive clutch and a tire tolerance compensated clutch slip value, with the following steps then being able to be carried out determining an actual clutch slip value corresponding to a difference between the speed of the primary axle and the speed of the secondary axle; determining a tire tolerance compensated clutch slip value corresponding to the actual clutch slip value while taking account of a property difference of the wheels of the primary axle and of the wheels of the secondary axle; determining a reference secondary axle torque corresponding to the proportion of the driving torque which is transmitted to the secondary axle and for which a tire tolerance compensated clutch slip value of substantially zero is expected; checking at least the following torque increase conditions: whether the actual clutch slip value is larger than a threshold value; whether the tire tolerance compensated clutch slip value is larger than a further threshold value; and whether the desired clutch torque is larger than the reference secondary axle torque, wherein the desired clutch torque/control signal relationship is changed in the sense of an increase of the proportion of the driving torque transmitted to the secondary axle with a given desired clutch torque when the named torque increase conditions are satisfied.

In this method, at least three torque increase conditions are checked. It is ensured by the check whether the actual clutch slip value is larger than a threshold value that the clutch is in slip and is not blocked, for instance. The proportion of the driving torque transmitted to the secondary axle thus corresponds to the clutch torque. It is found by the additional check whether the tire tolerance compensated clutch slip value is larger than a further threshold value whether a higher speed is also then present at the primary axle than at the secondary axle when a property difference of the wheels of the primary axle and of the wheels of the secondary axle is taken out. Such a property difference may cause a certain speed difference on their own that should, however, remain out of consideration in the present method.

The threshold value for the actual clutch slip value and the further threshold value for the tire tolerance compensated slip value may be selected to be the same or different. The respective threshold value may in particular have the value zero or by a tolerance value, which differs only slightly from the value zero.

It is then found on the basis of the further check whether the desired clutch torque is larger than the reference secondary axle torque whether an unequal distribution of the driving torque would actually have to take place in favor of the secondary axle on the basis of the preset desired clutch torque.

If all these three conditions are satisfied, it is assumed that the clutch is transmitting too small a proportion of the driving torque to the secondary axle—with respect to the preset desired clutch torque—and the desired clutch torque/control signal relationship is corrected accordingly.

The method explained above relates to the case that wear phenomena at the clutch actuator change the desired clutch torque/control signal relationship in the sense that the clutch transmits too small a proportion of the driving torque to the secondary axle with respect to a preset desired clutch torque (i.e., the adjustment path of the actuator is too small). The principle may, however, also be transferred to the converse case (i.e., if the explained wear phenomena of the clutch actuator have the result that the actuator actuates the clutch in the sense of too high a torque transmission (adjustment path too large) with respect to a preset desired clutch torque).

The present disclosure therefore also relates to a method in which a clutch slip value and reference secondary axle torque are in turn determined. This reference secondary axle torque corresponds to that proportion of the driving torque that is transmitted to the secondary axle and for which a clutch slip value of substantially zero theoretically results. The explained reference secondary axle torque therefore also serves as a reference point for the check of the setting precision.

In this respect, at least the two following conditions are checked that are also called torque reduction conditions in the following. A check is made, on the one hand, whether the clutch slip value corresponds to a predetermined threshold value or is smaller than or equal to this threshold value, with this threshold value in particular being formed by the value zero or by a tolerance value which only slightly differs from the value zero. It is, therefore, found by this check whether the speed of the secondary axle is of the same magnitude as the speed of the primary axle (or is larger than it).

A check is made, on the other hand, whether the desired clutch torque is smaller than the reference secondary axle torque. It is, therefore, found by this check whether a non-balanced distribution of the driving torque to the vehicle axles is expected on the basis of the preset desired value for the clutch torque such that only a comparatively small proportion of the driving torque should be transmitted to the secondary axle and such that the speed of the secondary axle should accordingly be lower than the speed of the primary axle.

Provided that these two conditions are satisfied, the desired clutch torque/control signal relationship is changed in the sense of a reduction of the proportion of the driving torque transmitted to the secondary axle (with a given desired clutch torque).

The above method is thus also based on a comparison of the desired clutch torque with a reference secondary axle torque, which corresponds to a predetermined balance state of the distribution of the driving torque. The required calculations are thereby very simple and the required measured values are available via the data bus of the vehicle.

The above method may be combined with the first-explained method to enable a correction of the desired clutch torque/control signal relationship in both directions.

The clutch slip value named in connection with the second method is preferably a tire tolerance compensated clutch slip value that corresponds to a difference between the speed of the primary axle and the speed of the secondary axle, with a property difference of the wheels of the primary axle and of the wheels of the secondary axle additionally being taken into account by determination of a tire tolerance compensation value. Not reaching of the threshold value (clutch slip value is negative) results, in this case, on the basis of the taking into account of the tire tolerance compensation value.

In a further development of the method, a check is not only made whether the tire tolerance compensated clutch slip value is less than a predetermined threshold value, but rather a check is made as an additional torque reduction condition whether the actual clutch slip value amounts to substantially zero (i.e., while taking account of the existing measurement tolerances). A conclusion may be namely drawn from this that the clutch is already blocked. Only if this check also delivers a positive result is the desired clutch torque/control signal relationship changed in the sense of a reduction of the torque transmission.

In another respect, an averaging of the speeds and/or driving torques over time may take place, for example, to increase the precision of the calculations and checks, for example, to balance the influence of bumps.

Finally, provided that a check is made whether the (actual or tire tolerance compensated) clutch threshold value is "larger" or "smaller" than an associated threshold value, or provided that a check is made whether the desired clutch torque is "larger" or "smaller" than the reference secondary axle torque, the condition "larger than or equal to" ($\geqq$) or the condition "smaller than or equal to" ($\leqq$) may also be checked in a generally equivalent manner. It is only important whether these two checks delivery mutually contradictory results, with the desired clutch torque/control signal relationship being matched if this is the case.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 shows a flow chart of a method for the readjustment of a clutch actuator; and FIG. 4 shows a flow chart of another method for the readjustment of a clutch actuator.

Corresponding reference numerals indicate corresponding parts throughout the several views of the drawings.

DETAILED DESCRIPTION

Example embodiments will now be described more fully with reference to the accompanying drawings.

Figure 1:
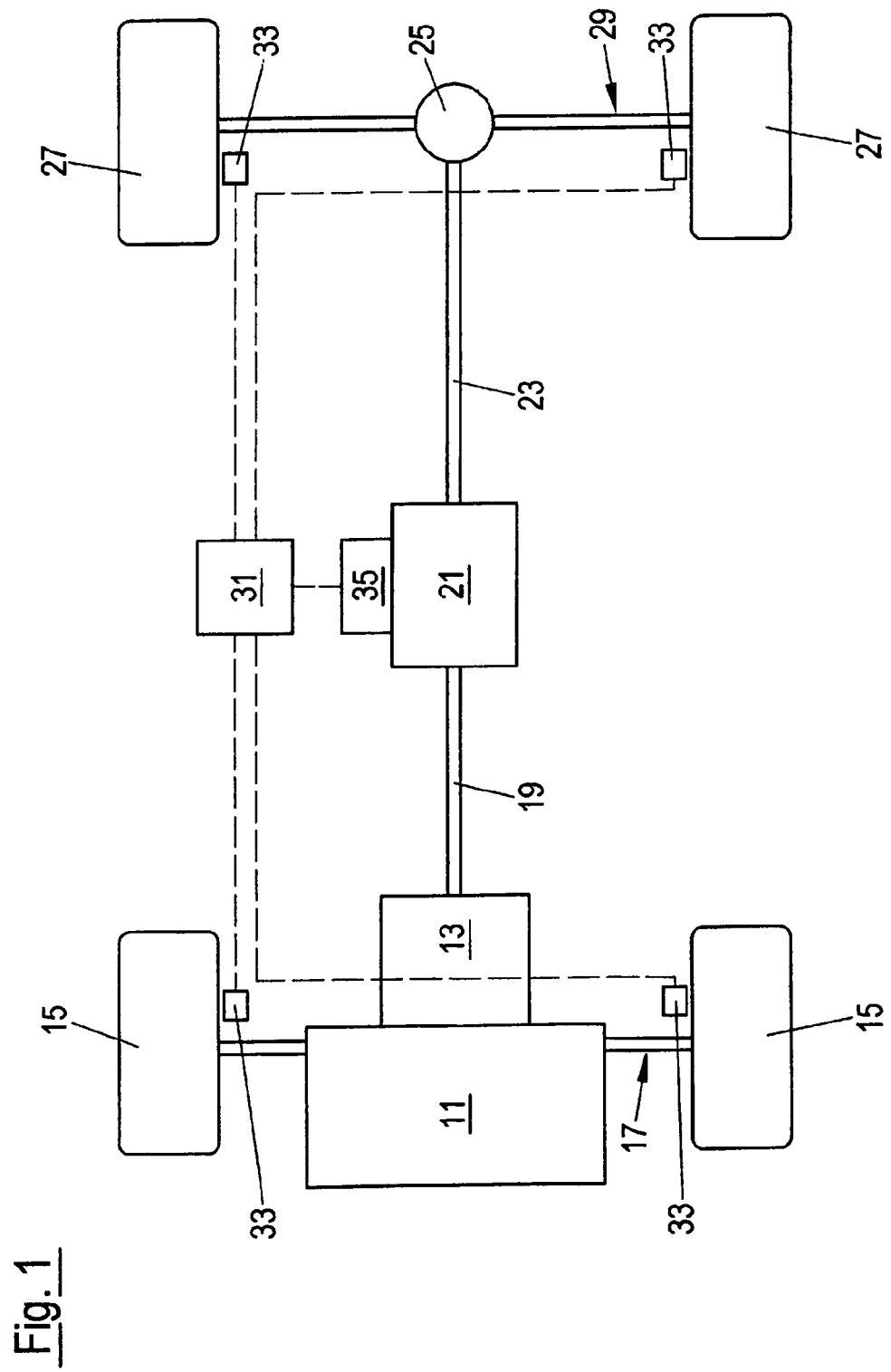
FIG. 1 shows a powertrain of a motor vehicle with an all-wheel drive clutch.

FIG. 1 shows a powertrain of a motor vehicle in a schematic representation. An engine 11 drives two wheels 15 of a front axle 17 via a transmission unit 13 and a front axle differential gear (not shown). Front axle 17 thus forms a primary axle. Engine 11 additionally drives two wheels 27 of a rear axle 29 via the transmission unit 13, a first Cardan shaft 19, an all-wheel drive clutch 21, a second Cardan shaft 23 and a rear axle differential gear 25. Rear axle 29 in this respect forms a secondary axle of the vehicle. An electronic control unit 31 of the vehicle is connected at the input side to four wheel speed sensors 33 which are associated with front wheels 15 and rear wheels 27. Control unit 31 may optionally be connected to further sensors (e.g. to a steering angle sensor, a yaw rate sensor, etc. (not shown)). At the output side, control unit 31 is connected to an actuator 35 for the actuation of the all-wheel drive clutch 21. Actuator 35, for example, has an electric motor with a reduction gear unit and a ramp ring mechanism.

All-wheel drive clutch 21 may serve optionally to transmit a part of the driving torque of engine 11 to rear axle 29, with first Cardan shaft 19 corresponding to an input shaft of all-wheel drive clutch 21 and second Cardan shaft 23 corresponding to an output shaft of all-wheel drive clutch 21. Torque transmission takes place in accordance with a preset desired clutch torque. This desired clutch torque may be determined by control unit 31 on the basis of the signals of wheel speed sensors 33 and, optionally, of further sensors, with these signals allowing conclusions on specific driving state parameters (e.g. tire slip, yaw rate, etc.). All-wheel drive clutch 21 has a friction clutch, for example a multi-disk clutch, for the desired torque transmission. The vehicle is all-wheel driven provided that a driving torque is transmitted to rear axle 29 via all-wheel drive clutch 21. All-wheel drive clutch 21 may also be provided at a different position of the powertrain (e.g., at transmission unit 13 or at rear axle differential gear 25).

The desired clutch torque calculated by control unit 31 may be converted into a control signal for actuator 35 in accordance with a stored desired clutch torque/control signal relationship. This may be done in control unit 31 or in a separate control unit (not shown) associated with the actuator. This control signal corresponds to a specific adjustment path of actuator 35 and thus of all-wheel drive clutch 21.

However, the desired clutch torque/control signal relationship may change on the basis of wear phenomena at actuator 35 or at clutch 21 over time so that the clutch torque actually set (actual value) by means of actuator 35 no longer corresponds to the desired clutch torque value preset by control unit 31. The setting precision of actuator 35 and of all-wheel drive clutch 21, therefore, deteriorates.

Figure 2:
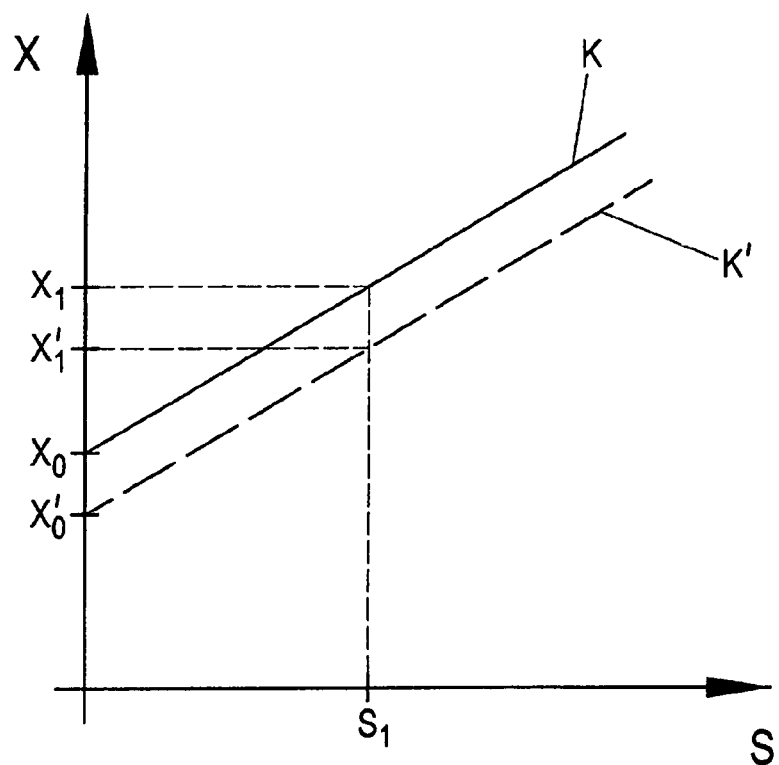
FIG. 2 shows a characteristic of a clutch actuator.

FIG. 2 illustrates this phenomenon with reference to an actuator characteristic K shown in idealized form. What is shown is the adjustment path x of actuator 35 in dependence on the control signal s which is generated on the basis of the then current clutch torque demand in accordance with the valid desired clutch torque/control signal relationship. The adjustment path x corresponds to the actual value of the clutch torque. The characteristic K has a linear curve in the region relevant here. The adjustment path with a clutch torque demand zero or at s=0 amounts to $x_0$. An adjustment path $x_1$ results for a specific control signal $s_1$. Wear phenomena at actuator 35 and at clutch 21 can result in a characteristic K', which substantially has the same gradient as the original characteristic K, but is offset. This characteristic K', therefore, has the value $x_0'$ at the ordinate. A different (here: smaller) adjustment path $x_1'$ than for the original characteristic K results for the control signal $s_1$ so that a different clutch torque is set at all-wheel drive clutch 21 than in accordance with the characteristic K. A different (here: smaller) proportion of the driving torque is therefore transmitted to the secondary axle of the vehicle (rear axle 29 in accordance with FIG. 1) than set in accordance with the desired clutch torque.

Actuator 35 and clutch 21 in accordance with FIG. 1 are, therefore, regularly readjusted. Two variations of a corresponding method are explained in the following.

In the first variation in accordance with FIG. 3, in step S1, an actual clutch slip value $\Delta n_{real}$ is determined with reference to signals of the wheel speed sensors 33 (FIG. 1). This corresponds to a difference between the speed of front wheels 15 and rear wheels 27. The actual clutch slip value $\Delta n_{real}$ is, therefore, positive when the speed of front wheels 15 (i.e., speed of the primary axle) is larger than the speed of rear wheels 27 (i.e., speed of the secondary axle) and it is negative in the reverse case.

In step S2, a tire tolerance compensated clutch slip value $\Delta n_{comp}$ is determined. This corresponds to a difference between the speed of front wheels 15 and of the speed of rear wheels 27, with additionally, however, a property difference of wheels 15, 27 being taken into account (e.g., a slightly different diameter of front wheels 15, on the one hand, and of rear wheels 27, on the other hand). A corresponding compensation value is determined by control unit 31 by long term measurements.

In addition, in step S3, the instantaneous driving torque of engine 11 is determined with reference to engine data and to data of a transmission control of the vehicle and a so-called reference secondary axle torque $\text{Mref}_{SA}$ is determined from this driving torque as well as from a proportional factor that has been fixed for the respective vehicle in accordance with the axle load distribution. This corresponds to that proportion of the driving torque which is transmitted to rear axle 29 and for which a tire tolerance compensated clutch slip value $\Delta n_{comp}$ of substantially zero is expected at clutch 21.

A check is made in step S4 whether the actual clutch slip value $\Delta n_{real}$ is larger than a threshold value Thresh1 which has the value zero, for example. If this condition is not satisfied, a start is made again with step S1.

Otherwise, in step S5, a check is made whether the tire tolerance compensated clutch slip value $\Delta n_{comp}$ is larger than a threshold value Thresh2 which likewise amounts to zero, for example. If this condition is not satisfied, a start is made again with step S1.

Otherwise, in step S6, a check is made whether the desired clutch torque $M_D$ preset by control unit 31 is larger than the reference secondary axle torque $\text{Mref}_{SA}$ determined in step S3. If this condition is not satisfied, a start is made again with step S1.

Otherwise, in step S7, the desired clutch torque/control signal relationship is changed, and such that now a higher proportion of the driving torque is transmitted to rear axle 29 for a given desired clutch torque than with the last valid desired clutch torque/control signal relationship. This new relationship is stored and used as the basis for the following setting procedures.

It is hereby ensured that an imprecision of the setting procedures that gradually arises is recognized by simple measurements and calculations and is compensated by readjustment. Since a state of a substantially uniform distribution of the driving torque to front axle 17 and rear axle 29 is selected as a reference point for this check, the readjustment of actuator 35 and of clutch 21 is oriented on a range of the desired clutch torque/control signal relationship, which is particularly relevant in practice for the setting procedures in operation of all-wheel drive clutch 21 so that a particularly high precision is achieved with respect to the setting precision observation.

It should be noted with respect to the method in accordance with FIG. 3 that steps S1 to S6 may also be carried out in a different order. Steps S1 and S4 may also be omitted. Alternatively, steps S2 and S5 may be omitted, with the fixing of the reference secondary axle torque $\text{Mref}_{SA}$ in this case not being based on the tire tolerance compensated clutch slip value $\Delta n_{comp}$, but on the actual slip value $\Delta n_{real}$.

FIG. 4 shows a second variation of the method, which is suitable to recognize a positional imprecision in a simple manner if too high a proportion of the driving torque is transmitted to rear axle 29 as a consequence of a preset desired clutch torque.

In steps S11 to S13, an actual clutch slip value $\Delta n_{real}$, a tire tolerance compensated clutch slip value $\Delta n_{comp}$ or a reference secondary axle torque $\text{Mref}_{SA}$ are determined—as in the steps S1 to S3 in accordance with FIG. 3.

In step S14, a check is made whether the actual clutch slip value $\Delta n_{real}$ amounts to zero while taking account of the measurement tolerances (i.e., whether clutch 21 is blocked). If this condition is not satisfied, a start is made again with step S11.

Otherwise, in step S15, a check is made whether the tire tolerance compensated clutch slip value $\Delta n_{comp}$ is smaller than a threshold value Thresh (or alternatively is "smaller than or equal to" this threshold value, smaller than or equal to zero, for example). If this condition is not satisfied, a start is made again with step S11.

Otherwise, in step S16, a check is also made whether the desired clutch torque $M_D$ preset by control unit 31 is lower than the reference secondary axle torque $\text{Mref}_{SA}$. If this condition is not satisfied, a start is made again with step S11.

Otherwise, in step S17, the desired clutch torque/control signal relationship is changed such that now a smaller proportion of the driving torque is transmitted to rear axle 29 with a preset desired clutch torque than with the last valid desired torque clutch/control signal relationship.

The method in accordance with FIG. 3 and the method in accordance with FIG. 4 may also be combined with one another to be able to compensate positional imprecision in both directions.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for calibrating an actuator of an all-wheel drive clutch of a motor vehicle having at least a part of a driving torque permanently transmitted to a primary axle and a part of the driving torque optionally transmitted to a secondary axle by the clutch, the method comprising:
    calculating a desired clutch torque ($M_D$) on the basis of driving state parameters;
    determining a control signal for the actuator from the desired clutch torque in accordance with a preset desired clutch torque/control signal relationship;
    determining a clutch slip value ($\Delta n$) that corresponds to a difference between a speed of the primary axle and a speed of the secondary axle;
    determining a reference secondary axle torque ($\text{Mref}_{SA}$) that corresponds to a proportion of the driving torque that is transmitted to the secondary axle and for which a clutch slip value ($\Delta n$) of substantially zero is expected;
    comparing the clutch slip value ($\Delta n$) with a threshold value (Thresh) and comparing the desired clutch torque ($M_D$) with the reference secondary axle torque ($\text{Mref}_{SA}$);
    checking torque increase conditions by determining whether the clutch slip value ($\Delta n$) is larger than the threshold value (Thresh) and whether the desired clutch torque ($M_D$) is larger than the reference secondary axle torque ($\text{Mref}_{SA}$);
    changing the desired clutch torque/control signal relationship in dependence on a result of the comparisons, wherein the desired clutch torque/control signal relationship is changed in the sense of an increase in the proportion of the driving torque transmitted to the secondary axle by the clutch if the torque increase conditions are satisfied; and
    using the changed desired clutch torque/control signal relationship to determine the control signal for the actuator upon subsequent actuation of the clutch.

2. The method in accordance with claim 1, wherein the clutch slip value ($\Delta n$) is a tire tolerance compensated clutch slip value ($\Delta n_{comp}$) that corresponds to a difference between the speed of the primary axle and the speed of the secondary axle while taking account of a property difference of the wheels of the primary axle and the wheels of the secondary axle.

3. The method in accordance with claim 1, further comprising:
determining an actual clutch slip value ($\Delta n_{real}$) that corresponds to a difference between the speed of the primary axle and the speed of the secondary axle;
determining a tire tolerance compensated clutch slip value ($\Delta n_{comp}$) that corresponds to a difference between the speed of the primary axle and the speed of the secondary axle while taking account of a property difference of the wheels of the primary axle and the wheels of the secondary axle;
determining a value for the reference secondary axle torque ($Mref_{SA}$) that corresponds to the proportion of the driving torque that is transmitted to the secondary axle for which a tire compensated clutch slip value ($\Delta n_{comp}$) of substantially zero is expected; and
checking torque increase conditions by determining whether the actual clutch slip value ($\Delta n_{real}$) is larger than a first threshold value (Thresh1), whether the tire tolerance compensated clutch slip value ($\Delta n_{comp}$) is larger than a second threshold value (Thresh2), and whether the desired clutch torque ($M_D$) is larger than the reference secondary axle torque ($Mref_{SA}$);
wherein the desired clutch torque/control signal relationship is changed in the sense of an increase in the proportion of the driving torque transmitted to the secondary axle if the torque increase conditions are satisfied.

4. The method in accordance with claim 1, further comprising checking torque reduction conditions by determining whether the clutch slip value ($\Delta n$) is of equal magnitude to or smaller than the threshold value (Thresh) and whether the desired clutch torque ($M_D$) is smaller than the reference secondary axle torque ($Mref_{SA}$);
wherein the desired clutch torque/control signal relationship is changed in the sense of a decrease in the proportion of the driving torque transmitted to the secondary axle if the torque reduction conditions are satisfied.

5. The method in accordance with claim 4, wherein the clutch slip value ($\Delta n$) is a tire tolerance compensated clutch slip value ($\Delta n_{comp}$) that corresponds to a difference between the speed of the primary axle and the speed of the secondary axle while taking account of a property difference of the wheels of the primary axle and the wheels of the secondary axle.

6. The method in accordance with claim 1, further comprising:
determining an actual clutch slip value ($\Delta n_{real}$) that corresponds to a difference between the speed of the primary axle and the speed of the secondary axle;
determining a tire tolerance compensated clutch slip value ($\Delta n_{comp}$) that corresponds to a difference between the speed of the primary axle and the speed of the secondary axle while taking account of a property difference of the wheels of the primary axle and the wheels of the secondary axle;
determining a value for the reference secondary axle torque ($Mref_{SA}$) that corresponds to the proportion of the driving torque that is transmitted to the secondary axle for which a tire compensated clutch slip value ($\Delta n_{comp}$) of substantially zero is expected; and
checking torque reduction conditions by determining whether the actual clutch slip value ($\Delta n_{real}$) amounts to substantially zero, whether the tire tolerance compensated clutch slip value ($\Delta n_{comp}$) is smaller than the threshold value (Thresh), and whether the desired clutch torque ($M_D$) is smaller than the reference secondary axle torque ($Mref_{SA}$);
wherein the desired clutch torque/control signal relationship is changed in the sense of a reduction in the proportion of the driving torque transmitted to the secondary axle if the torque reduction conditions are satisfied.

7. The method in accordance with claim 1, wherein the threshold value (Thresh) amounts to zero.

8. The method in accordance with claim 1, wherein the clutch slip value ($\Delta n$) is only determined while driving straight ahead and at a constant driving speed or a constant acceleration of the motor vehicle.

9. The method in accordance with claim 1, wherein the speed of the primary axle and the speed of the secondary axle are determined from signals of wheel speed sensors that are associated with the wheels of the motor vehicle.

10. The method in accordance with claim 1, wherein the speed of the primary axle and the speed of the secondary axle are averaged over a predetermined time period to determine the clutch slip value ($\Delta n$).

11. The method in accordance with claim 1, wherein the driving torque is averaged over a predetermined time period to determine the reference secondary axle torque ($Mref_{SA}$).

12. The method in accordance with claim 1, wherein the driving torque is determined with reference to engine data and to data of a transmission control of the motor vehicle.

13. The method in accordance with claim 1, wherein the proportion of the driving torque transmitted to the secondary axle is fixed empirically and/or in accordance with an axis load distribution of the motor vehicle.

14. The method in accordance with claim 1, wherein the desired clutch torque/control signal relationship is changed by changing an offset value.

15. The method in accordance with claim 1, wherein the desired clutch torque/control signal relationship is changed proportionally to the difference of the clutch slip value from the threshold value and/or proportionally to the difference of the desired clutch torque from the reference secondary axle torque and/or in accordance with a predetermined fixed value.

16. A method for calibrating an actuator of an all-wheel drive clutch in a motor vehicle to accommodate for wear in the actuator and/or in the clutch, the motor vehicle transmitting at least part of a drive torque permanently to a primary axle and a part of the drive torque is optionally transmitted through the clutch to a secondary axle, the method comprising:
calculating a desired clutch torque ($M_D$) to be transmitted through the clutch to the secondary axle based on predetermined driving state parameters;
determining a control signal for the actuator based on the desired clutch torque ($M_D$) in accordance with a first desired clutch torque/control signal relationship having a first characteristic (K);
determining a clutch slip value ($\Delta n$) that corresponds to a difference in rotary speed between the primary axle and the secondary axle;
determining a reference secondary axle torque ($Mref_{SA}$) that corresponds to a proportion of the drive torque transmitted to the secondary axle when the clutch slip value ($\Delta n$) is substantially zero;
comparing the clutch slip value ($\Delta n$) to a threshold value (Thresh);
comparing the desired clutch torque ($M_D$) with the reference secondary axle torque ($Mref_{SA}$);
checking torque increase conditions by determining whether the clutch slip value ($\Delta n$) is larger than the threshold value (Thresh) and whether the desired clutch torque ($M_D$) is larger than the reference secondary axle torque ($Mref_{SA}$);

changing the first desired clutch torque/control signal relationship to a second desired clutch torque/control signal relationship having a second characteristic (K') in dependence on a result of the comparisons, wherein the first desired clutch torque/control signal relationship is changed to the second desired clutch torque-control signal relationship in the sense of an increase in the proportion of the driving torque transmitted to the secondary axle through the clutch when the torque increase conditions are satisfied; and using the second desired clutch torque/control signal relationship to determine the control signal for the actuator upon subsequent actuation of the clutch.

17. A method for calibrating an actuator of an all-wheel drive clutch of a motor vehicle to accommodate for wear in the actuator and/or in the clutch, the motor vehicle transmitting at least part of a drive torque permanently to a primary axle and a part of the drive torque is optionally transmitted through the clutch to a secondary axle, the method comprising:

calculating a desired clutch torque ($M_D$) to be transmitted through the clutch to the secondary axle based on predetermined driving state parameters;

determining a control signal for the actuator based on the desired clutch torque ($M_D$) in accordance with a first desired clutch torque/control signal relationship having a first characteristic (K);

determining a clutch slip value ($\Delta n$) that corresponds to a difference in rotary speed between the primary axle and the secondary axle;

determining a reference secondary axle torque ($Mref_{SA}$) that corresponds to a proportion of the drive torque transmitted to the secondary axle when the clutch slip value ($\Delta n$) is substantially zero;

comparing the clutch slip value ($\Delta n$) to a threshold value (Thresh);

comparing the desired clutch torque ($M_D$) with the reference secondary axle torque ($Mref_{SA}$);

determining an actual clutch slip value ($\Delta n_{real}$) that corresponds to a difference between the speed of the primary axle and the speed of the secondary axle;

determining a tire tolerance compensated clutch slip value ($\Delta n_{comp}$) that corresponds to a difference between the speed of the primary axle and the speed of the secondary axle while taking account of a property difference of the wheels of the primary axle and the wheels of the secondary axle;

determining a value for the reference secondary axle torque ($Mref_{SA}$) that corresponds to the proportion of the driving torque that is transmitted to the secondary axle when the tire compensated clutch slip value ($\Delta n_{comp}$) is substantially zero; and checking torque increase conditions by determining whether the actual clutch slip value ($\Delta n_{real}$) is larger than a first threshold value (Thresh1), whether the tire tolerance compensated clutch slip value ($\Delta n_{comp}$) is larger than a second threshold value (Thresh2), and whether the desired clutch torque ($M_D$) is larger than the reference secondary axle torque ($Mref_{SA}$);

changing the first desired clutch torque/control signal relationship to a second desired clutch torque/control signal relationship having a second characteristic (K') in dependence on a result of the comparisons; and using the second desired clutch torque/control signal relationship to determine the control signal for the actuator upon subsequent actuation of the clutch;

wherein the first desired clutch torque/control signal relationship is changed to the second desired clutch torque/control signal relationship in the sense of an increase in the proportion of the driving torque transmitted to the secondary axle through the clutch when the torque increase conditions are satisfied.

18. A method for calibrating an actuator of an all-wheel drive clutch of a motor vehicle having at least a part of a driving torque permanently transmitted to a primary axle and a part of the driving torque optionally transmitted to a secondary axle by the clutch, the method comprising:

calculating a desired clutch torque ($M_D$) on the basis of driving state parameters;

determining a control signal for the actuator from the desired clutch torque in accordance with a preset desired clutch torque/control signal relationship;

determining a clutch slip value ($\Delta n$) that corresponds to a difference between a speed of the primary axle and a speed of the secondary axle;

determining a reference secondary axle torque ($Mref_{SA}$) that corresponds to a proportion of the driving torque that is transmitted to the secondary axle and for which a clutch slip value ($\Delta n$) of substantially zero is expected;

comparing the clutch slip value ($\Delta n$) with a threshold value (Thresh) and comparing the desired clutch torque ($M_D$) with the reference secondary axle torque ($Mref_{SA}$);

determining an actual clutch slip value ($\Delta n_{real}$) that corresponds to a difference between the speed of the primary axle and the speed of the secondary axle;

determining a tire tolerance compensated clutch slip value ($\Delta n_{comp}$) that corresponds to a difference between the speed of the primary axle and the speed of the secondary axle while taking account of a property difference of the wheels of the primary axle and the wheels of the secondary axle;

determining a value for the reference secondary axle torque ($Mref_{SA}$) that corresponds to the proportion of the driving torque that is transmitted to the secondary axle for which a tire compensated clutch slip value ($\Delta n_{comp}$) of substantially zero is expected;

checking torque increase conditions by determining whether the actual clutch slip value ($\Delta n_{real}$) is larger than a first threshold value (Thresh1), whether the tire tolerance compensated clutch slip value ($\Delta n_{comp}$) is larger than a second threshold value (Thresh2), and whether the desired clutch torque ($M_D$) is larger than the reference secondary axle torque ($Mref_{SA}$); and changing the desired clutch torque/control signal relationship in dependence on a result of the comparisons, wherein the desired clutch torque/control signal relationship is changed in the sense of an increase in the proportion of the driving torque transmitted to the secondary axle if the torque increase conditions are satisfied;

using the changed desired clutch torque/control signal relationship to determine the control signal for the actuator upon subsequent actuation of the clutch.

* * * * *